US009475425B2

United States Patent
Krick et al.

(10) Patent No.: US 9,475,425 B2
(45) Date of Patent: Oct. 25, 2016

(54) SYSTEM FOR CONTROLLING THE ELECTRICAL POWER SUPPLY OF A PLURALITY OF LIGHT SOURCES USING A MULTIPHASE CONVERTER

(71) Applicant: Valeo Vision, Bobigny (FR)

(72) Inventors: Sebastian Krick, Paris (FR); Patrick Wacheux, Bois le Roy (FR); Huy-Cuong Nguyen, Villers sur Marne (FR); Marc Duarte, Villemomble (FR); Dominique Bodzianny, Neuilly sur Marne (FR); Olivier-Sebastien Lesaffre, Pantin (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/791,525

(22) Filed: Jul. 6, 2015

(65) Prior Publication Data

US 2016/0001699 A1    Jan. 7, 2016

(30) Foreign Application Priority Data

Jul. 7, 2014 (FR) .................................... 14 56516

(51) Int. Cl.
*H05B 33/08* (2006.01)
*B60Q 3/00* (2006.01)
*H05B 37/02* (2006.01)

(52) U.S. Cl.
CPC ............. *B60Q 3/00* (2013.01); *H05B 33/0809* (2013.01); *H05B 33/0845* (2013.01); *H05B 37/02* (2013.01)

(58) Field of Classification Search
CPC .......... H05B 33/0809; H05B 33/0845; H05B 37/02; B60Q 3/00

USPC .................................. 315/77–82, 200 R–297
See application file for complete search history.

(56) References Cited

U.S. PATENT DOCUMENTS

| | | | |
|---|---|---|---|
| 7,233,115 B2 | 6/2007 | Lys | |
| 7,256,554 B2 | 8/2007 | Lys | |
| 7,358,681 B2 | 4/2008 | Robinson et al. | |
| 7,358,706 B2 | 4/2008 | Lys | |
| 7,420,335 B2 | 9/2008 | Robinson et al. | |
| 7,459,864 B2 | 12/2008 | Lys | |
| 7,557,521 B2 | 7/2009 | Lys | |
| 7,659,673 B2 | 2/2010 | Lys | |
| 7,737,643 B2 | 6/2010 | Lys | |
| 2002/0101197 A1* | 8/2002 | Lys | H05B 33/086 315/291 |
| 2005/0213352 A1 | 9/2005 | Lys | |
| 2005/0213353 A1 | 9/2005 | Lys | |
| 2005/0218838 A1* | 10/2005 | Lys | F21S 48/325 315/291 |
| 2005/0218870 A1 | 10/2005 | Lys | |
| 2005/0219872 A1 | 10/2005 | Lys | |
| 2005/0231133 A1 | 10/2005 | Lys | |
| 2006/0001381 A1 | 1/2006 | Robinson et al. | |
| 2007/0069664 A1 | 3/2007 | Robinson et al. | |
| 2007/0085489 A1 | 4/2007 | Robinson et al. | |

(Continued)

*Primary Examiner* — Douglas W Owens
*Assistant Examiner* — Jonathan Cooper
(74) *Attorney, Agent, or Firm* — Jacox, Meckstroth & Jenkins

(57) ABSTRACT

A device and a method for controlling the electrical power supply of a plurality of light sources, preferably of light-emitting diodes, or LEDs. The plurality of light sources is divided into at least two groups of light sources. The invention is noteworthy in that it allows the use of a multiphase step-up voltage converter for all the groups of light sources, whereas the measurements of the input currents for each of the phases of the converter give a reliable indication of the level of power required by one of the groups being powered.

22 Claims, 3 Drawing Sheets

(56) References Cited

U.S. PATENT DOCUMENTS

| | | |
|---|---|---|
| 2008/0012502 A1 | 1/2008 | Lys |
| 2012/0181931 A1 | 7/2012 | Katsura |
| 2012/0229114 A1* | 9/2012 | Yang ................... H02M 3/1584 323/299 |
| 2012/0319604 A1* | 12/2012 | Walters ............... H02M 3/1582 315/200 R |

* cited by examiner

SYSTEM FOR CONTROLLING THE ELECTRICAL POWER SUPPLY OF A PLURALITY OF LIGHT SOURCES USING A MULTIPHASE CONVERTER

CROSS-REFERENCE TO RELATED APPLICATIONS

This application claims priority to the French application 1456516 filed Jul. 7, 2014, which application is incorporated herein by reference and made a part hereof.

BACKGROUND OF THE INVENTION

1. Field of the Invention

The invention relates to the field of the electrical power supply of light sources, more precisely of light-emitting diodes, or LEDs. In particular, the invention relates to a system and method for controlling the electrical power supply of a plurality of light sources, arranged into several groups. Each group is powered by a series connection of a step-up voltage converter, for example of the boost type, and of a step-down voltage converter, for example of the buck type, the step-up converters of all the groups operating as a multiphase step-up voltage converter. The invention also relates to a lighting system for an automobile vehicle

2. Description of the Related Art

A light-emitting diode, or LED, is an electronic component capable of emitting light when it has an electrical current flowing through it. The light intensity emitted by a LED is in general dependent on the intensity of the electrical current flowing through it. In the automobile field, LED technology is increasingly being used in various lighting and signaling solutions.

A control circuit is used to control the current through an assembly or group of LEDs. The circuit defines the current flowing through a branch connected as a load and comprising the group of LEDs connected in series. A known solution is to use separate control circuits powering separate groups of LEDs, each group fulfilling a separate lighting function of an automobile vehicle. Amongst others, such functions comprise the high and low beam lights or the side lights. A known solution is to power each function independently from the other functions by a dedicated control circuit.

A dedicated control circuit comprises for example a step-up (boost) converter followed in series by a step-down (buck) converter. In such a case, the measurement of the input current of a dedicated control circuit gives, at any time, an indication relating to the output power required by the function in question. This indication is for example used by diagnostic means for the operation of the lighting functions of the automobile vehicle.

It is becoming more and more common to use a multiphase step-up voltage converter common to each of the lighting functions, followed in series by buck converters dedicated by function. A multiphase converter is obtained by connecting at the output several voltage step-up converters having a common control. The individual step-up converters acting as phases of the multiphase converter contribute in a combined manner to obtaining a common output voltage. The current consumed by each of the lighting functions is, in this case, supplied by a common control circuit. The measurement of the input current for each of the phases of the multiphase step-up converter is no longer necessarily representative of the output power required by each of the functions. A diagnostic system using the indication supplied by the input currents in order to deduce the state of operation of the respective lighting functions is no longer therefore capable of supplying reliable diagnostic indications. Indeed, the detection of false positives and/or false negatives may be the consequence of the use of the intensity of the input current of each individual step-up converter, which has now become an unsuitable quantity.

SUMMARY OF THE INVENTION

The aim of the invention is to provide a system for controlling the electrical power supply of a plurality of light sources overcoming at least one of the drawbacks of the prior art. Another aim of the invention is to provide a method for controlling the electrical power supply of a plurality of light sources together with a lighting system for an automobile vehicle using the control system according to the invention.

One subject of the invention is a device for controlling the electrical power supply of a plurality of light sources, the plurality of light sources being divided into at least two groups of light sources, each group having specific current needs. The device comprises for each group a branch comprising a converter of the voltage step-up type and a converter of the voltage step-down type connected in series and capable of converting an input voltage into a load voltage. The converters of the step-up type of each branch operate as a multiphase step-up converter. The device is noteworthy in that it furthermore comprises control means configured for adapting the input current of the step-up converter of each branch according to the specific current needs of the group connected as a load of the respective branch.

The control means can preferably adapt the input current of the step-up converter of each branch as a function of a voltage value representative of the average input current of the step-up converter of the branch and as a function of a fraction of the average value of the output voltage $V_{BOOST}$ of the multiphase converter. Advantageously, the voltage value representative of the average input current of a step-up converter is an image of the average current flowing in the inductance of the converter, this current being measured indirectly by a voltage measurement across the terminals of a shunt resistor.

Advantageously, the average of the output voltage $V_{BOOST}$ of the multiphase step-up converter may be obtained by a proportional-integrator corrector circuit, PI.

Preferably, the control means can comprise a comparator for each branch, which compares the voltage value representative of the average input current of the step-up converter of the branch with a fraction of the average value of the output voltage $V_{BOOST}$ of the multiphase step-up converter. The respective fractions define the specific current needs of the groups connected as loads of the respective branches. The fractions can advantageously be obtained by voltage divider circuits.

The control means advantageously comprise interruption means configured to interrupt the current operating cycle of a step-up converter, if the voltage value relating to it, representative of the average input current of the converter, exceeds the fraction of the average value of the output voltage $V_{BOOST}$ of the multiphase step-up converter with which it is compared.

Preferably, the control means can comprise detection means designed to detect a power supply need of each of the groups of light sources. The signal detected can be a message received by the detection means over a data communication means, such as a CAN bus of an automobile vehicle.

The control means can preferably comprise means designed to switch off the step-up and step-down converters of a branch, following the detection of a fault in the group which is connected to it as a load.

The control means can comprise clock means connected to the switches of each of the step-up converters and designed to control the latter. The clock means are designed to generate a similar clock signal for each of the converters, the phase difference between the signals preferably being 360° divided by the number of converters.

Preferably, the control means are implemented by a single microcontroller. Alternatively, several microcontrollers connected via communication means, and preferably via a databus of the controller area network, or CAN, type of an automobile vehicle, can jointly implement the functions of the control means.

The light sources are preferably light-emitting diodes, or LEDs. Each group of light sources preferably comprises a plurality of LEDs connected in series.

The device is preferably powered by a source of current, preferably a battery of an automobile vehicle.

Another subject of the invention is a lighting system for an automobile vehicle, comprising at least one device for controlling the electrical power supply of light sources, the plurality of light sources being divided into at least two groups of light sources. The lighting system is noteworthy in that the device for controlling the electrical power supply of light sources is a device according to the invention.

Yet another subject of the invention is a method for controlling the electrical power supply of a plurality of light sources, the plurality of light sources being divided into at least two groups of light sources, each group having specific current needs, and each group being connected as a load to a branch comprising a voltage converter of the step-up type and a voltage converter of the step-down type, connected in series and capable of converting an input voltage into a load voltage. The converters of the step-up type of each branch operate as a multiphase step-up converter. The method is noteworthy in that it comprises the following steps:

provide an average value of the output voltage $V_{BOOST}$ of the multiphase step-up converter, within control means;

provide the specific current needs of the group connected as a load of the respective branch, within control means; and adapt, via the control means, the input current of the step-up converter of each branch according to the specific current needs of the group connected as a load of the respective branch.

The system and method according to the invention allow a multiphase step-up voltage converter to be used in a common control circuit designed for the electrical power supply of a plurality of groups of light sources. At the same time, thanks to the invention, the measurement of the input current of each of the step-up converters, i.e. each phase of the multiphase converter becomes an indication representative of the output power required by a particular group of light sources. In the case where the device according to the invention is applied to a lighting system of an automobile vehicle, it has the advantage that the measurement of the input current of each phase of the multiphase step-up converter represents a reliable indication of the level of power required by a particular lighting function of the vehicle at any given moment. This measurement may be used in a known manner by existing diagnostic systems of an automobile vehicle. The invention therefore renders the use of a multiphase converter, such as it is often used for controlling LED diodes, compatible with diagnostic systems of existing automobile vehicles. Without the invention, the two systems exhibit inherent incompatibilities as described hereinabove.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the aid of the description and of the drawings, which are presented solely by way of non-limiting examples of the invention, and amongst which:

DETAILED DESCRIPTION OF THE PREFERRED EMBODIMENTS

In the following part, unless otherwise stated, similar references will be used for describing similar concepts and/or means in different embodiments of the invention. For example, the references 100 and 200 will be used to describe three embodiments of the device according to the invention.

Figure 1:
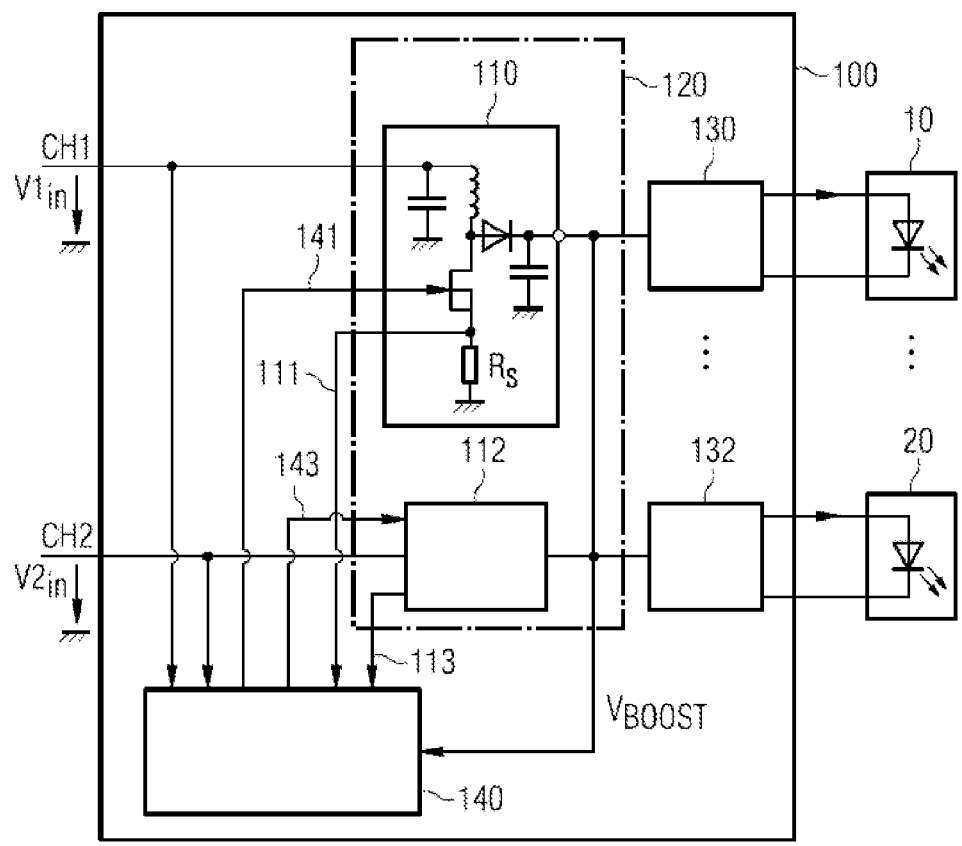
FIG. 1 is a schematic illustration of a preferred embodiment of the device according to the invention.

One preferred embodiment of the invention is illustrated schematically by FIG. 1. The device 100 allows the electrical power supply of a plurality of light sources, for example light-emitting diodes, or LEDs, to be controlled. A control is necessary since the light intensity of a LED depends on the current flowing through it. In many applications, and particularly in the application to a lighting system of an automobile vehicle, it is important to provide a constant brightness for each of the lighting functions, for example the daytime lights, the turning indicators, etc. Each of these lighting functions comprises in general a different number of LEDs connected in series and needs a specific current and voltage in order to provide the desired performance characteristics. The control of each lighting function, or of each group of light sources, indicated by 10, 20 in FIG. 1, is therefore carried out by control branches which are at least partially independent. For reasons of clarity of the description, FIG. 1 only illustrates two branches CH1, CH2. It goes without saying that a greater plurality of branches, each branch representing a separate lighting function, may be implemented in an analogous manner. Each branch may be powered by the same input voltage, or by separate input voltages. Each group of light sources 10, 20 is illustrated by an individual LED in order to make the illustration clearer. In reality, each of the groups 10, 20 may comprise a plurality of LEDs connected in series.

In a known manner, each branch comprises a step-up voltage converter of the buck type 110, 112 followed by a step-down voltage converter of the buck type 130, 132. In the following, the voltage step-up converters will be denoted as boost converters, whereas the voltage step-down converters will be denoted as buck converters. Other known architectures for converters, such as converters of the SEPIC ("single-ended primary-inductor converter") or flyback type may also nevertheless be envisioned without straying from the scope of the invention. Such converters are known per se in the prior art and their operation will not be detailed within the framework of the present description. The duty cycle of the switching means of a boost converter, such as an MOS field-effect transistor (MOSFET), allows the ratio between the output voltage and the input voltage to be defined. The duty cycle of the MOSFET is controlled by a clock signal not shown. For reasons of performance, it is advantageous to use parallel converters 110, 112, but using clock signals phase-shifted by 360° divided by the number of converters. The resulting duty cycle is then equal to the duty cycle of one of the converters multiplied by the number of phases, so as to yield the common output voltage of the multiphase boost converter 120, indicated by $V_{BOOST}$. Alternatively, the multiphase converter may be implemented in a know manner without clock signals, for example by quasi-resonance. The buck converters 130, 132 of each branch share in this common reservoir for controlling the groups of light sources 10, 20.

The device comprises control means 140, such as for example a programmable microcontroller, which is configured to adapt the input current of each boost converter 110, 112. The adaptation is applied as a function of a predetermined fraction of the average value of the voltage $V_{BOOST}$ observed, and also according to the specific current needs of each group 10, 20 connected as a load of the respective branch. If the control means are informed, for example by means of a message received over a CAN bus of an automobile vehicle, that a lighting function, for example represented by the group 10, is switched off, the control means are configured to conclude that the input current of the branch in question will be zero. If, on the other hand, the group 10 is switched on by a user, the control means are configured to conclude that a specific current is to be applied for the group 10 in question. The control means 140 use a voltage value 111, 113 at the input representative of the average input current of each of the boost converters 110, 112. As indicated for the converter 110, the voltage may be measured across the terminals of a shunt resistor $R_S$, which gives the product of the current in the MOSFET with the value of the resistance $R_S$. The current in question is equal to the current in the inductance of the converter, whose average current corresponds to the input current of the converter. If the voltage measured, which is an image of the input current, exceeds a predefined fraction of the average value of $V_{BOOST}$, the current operating cycle of the converter in question is interrupted by interruption means 141, 143 acting on the MOSFET of the converter. The predetermined fraction depends on the group being powered 10, 20 and on its state (ON/OFF). This implements a sharing of the input current between the phases 110, 112 of the multiphase converter 120, in such a manner as to reflect the power required by the groups of light sources attached to each phase.

When a fault is detected in one of the groups, the whole branch in question, including the boost and buck converter, can be switched off by control means not shown.

More concrete implementations of the invention will be described in the following.

Figure 2:
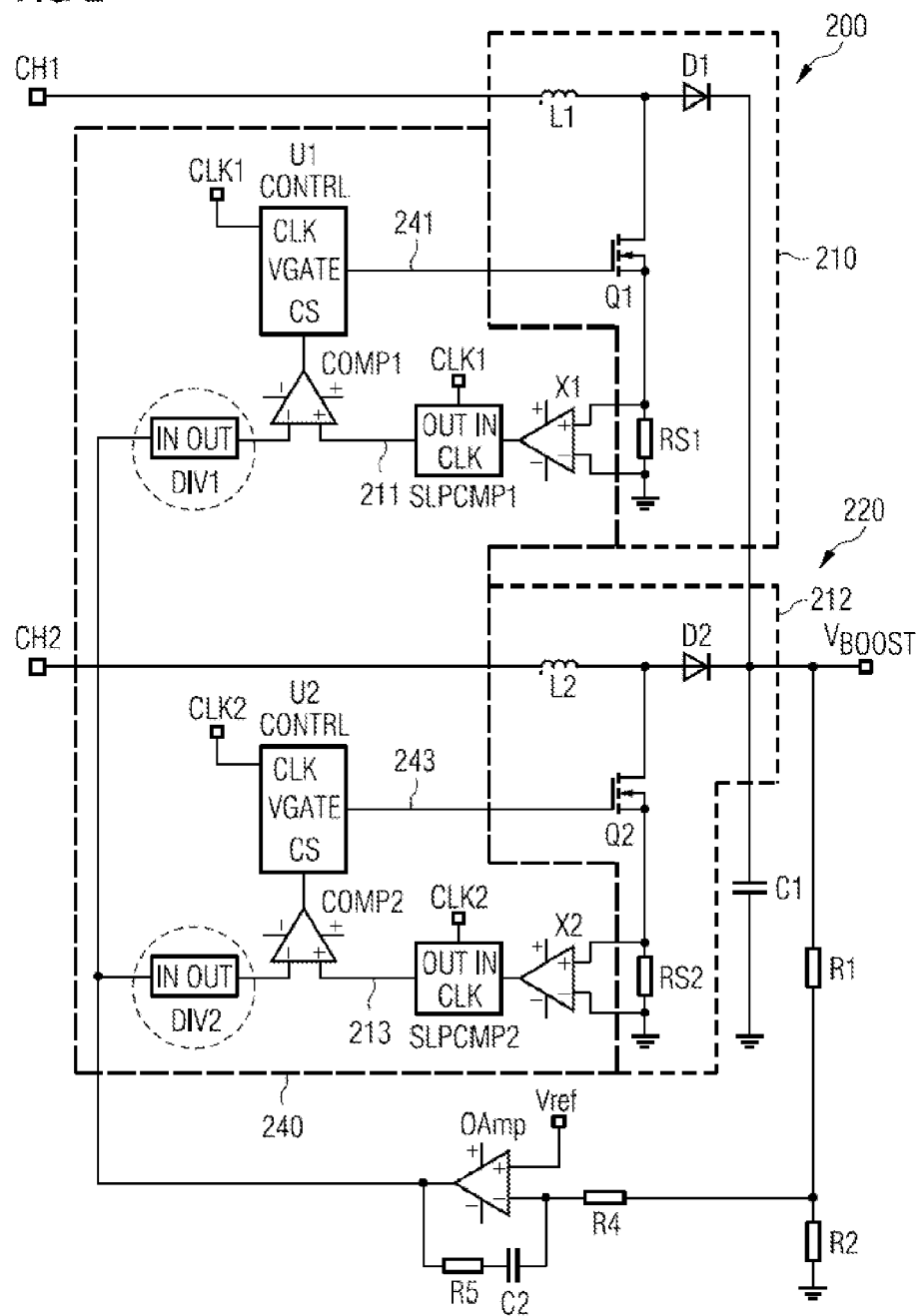
FIG. 2 is a schematic illustration of a preferred embodiment of a detail of the system device according to the invention.

FIG. 2 gives a schematic illustration of a detail of a device according to the invention. A multiphase boost converter 220 with two phases 210, 212 is shown without limiting the invention to this example. FIG. 2 also shows control means 240, only the functionalities of which useful for the description of the invention are shown. In order to facilitate the understanding of the invention, it is assumed that the boost converters 210, 212 operate in continuous mode. The currents in the inductances of the converters are therefore positive at all times. The chopping frequency is fixed and is imposed by the signal CLK. The clock signals CLK1 and CLK2 are out of phase by 180° in this example. A common capacitor C1 is connected to the output of the multiphase converter 220, which corresponds to the common output of the boost converters 210 and 212.

A corrector PI gives an average of the voltage $V_{BOOST}$ multiplied, in the case illustrated, by the ratio R2/(R2+R1) according to the reference voltage Vref. The output of the operational amplifier Oamp therefore provides the value made available to the control means 240.

For the example of the converter 210, this value is divided by divider means known per se in the prior art and marked by a dashed circle, before being brought to the negative terminal of a comparator COMP1.

On the other hand, the image of the current in the inductance L1, compensated with the slope compensator SLPCMP1 in order to avoid sub-harmonic oscillations, is presented to the positive terminal of the comparator COMP1. The current in the inductance L1 is the current of the MOSFET measured across the terminals of the shunt resistor RS1.

Figure 3:
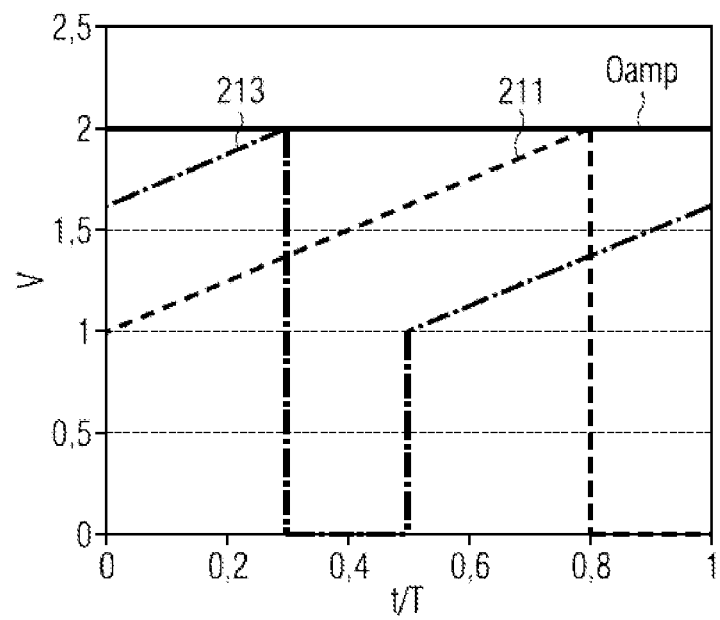
FIG. 3 is a graphical representation of the time variation of voltage signals measured during the operation of a prior art device.
Figure 4:
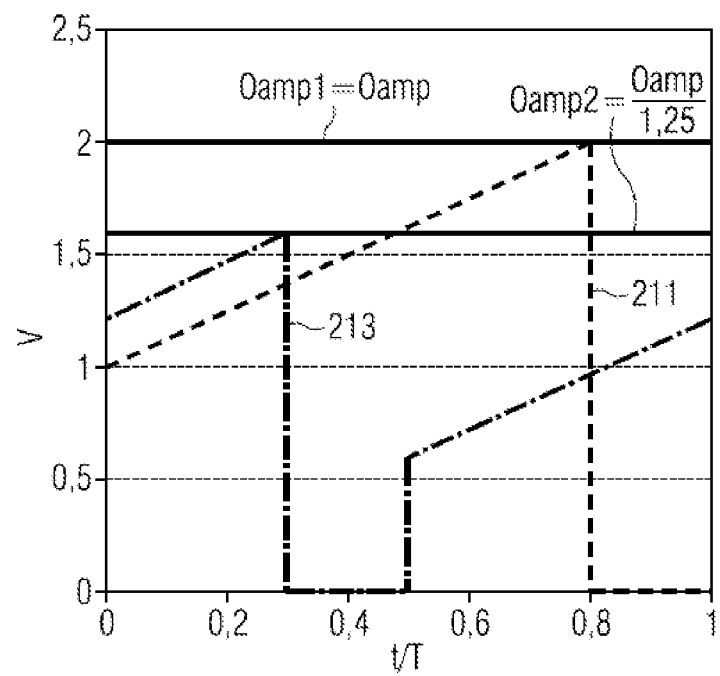
FIG. 4 is a graphical representation of the time variation of voltage signals measured during the operation of a preferred embodiment of the device according to the invention.

In order to illustrate the utility of this configuration, reference is made to the graphs in FIGS. 3 and 4. FIG. 3 shows the time variation of the signals 211 and 213 connected to the positive terminals of the comparators COMP1 and COMP2 respectively, in the case where the divider means encircled in FIG. 2 were not present (the dividers being equal to 1). The voltage signal provided by the output of Oamp is also shown. With CLK1 and CLK2 phase-shifted by 180°, the duty cycle is 0.8. One chopping period of the converter 210, 212 is illustrated. At 350 khz, the period illustrated corresponds to 2.85 µs. When the signal 211, respectively 213, reaches the level of the signal Oamp, the MOSFET of the converter is turned off by the signal 241, 243. This is the case at t=0.3 T for the signal 213 and t=0.8 T for the signal 211. The respective averages of the input currents of each converter 210, 212 are therefore equal and correspond to the average currents in L1 and L2.

FIG. 4 shows the time variation of the signals 211 and 213 connected to the positive terminals of the comparators COMP1 and COMP2 respectively, in the case where the divider means encircled in FIG. 2 are present. By way of example, the divider DIV1 is equal to 1, whereas the divider DIV2 is equal to 1.25. The value of the voltage signal provided by the output of Oamp is therefore divided by 1.25 prior to being compared with the signal 213 produced by the converter 212. With CLK1 and CLK2 phase-shifted by 180°, the duty cycle is 0.8. A chopping period of the converter 210, 212 is illustrated. When the signals 211 respectively 213 reach the level of the signals Oamp1 and Oamp2 respectively, the MOSFET of the converter in question is turned off by the signals 241, 243. This is the case at t=0.3 T for the signal 213 and t=0.8 T for the signal 211. The respective averages of the input currents of each converter 210, 212 are no longer equal and correspond to the different average currents in the inductances L1 and L2. The peak current in L2 is lower than the peak current in L1. The slopes of the signals remain unchanged with respect to the case illustrated by FIG. 3, since, on the one hand, neither the inductance nor the input voltage is altered and, on the other hand, the slope compensation does not change since the duty cycle is not altered.

It is clear that the circuit described may be modified by those skilled in the art in order to adapt the input currents of the boost converters to specific applications. The dividers of the output signal from the multiphase converter are, in this case, adapted to the values required for each converter.

For practical reasons, for example because of the limitation in output and input range of the comparators COMP1, COMP2, it can also be useful to divide the image of the current connected to the positive terminals of the comparators, including the slope compensation, by dedicated dividers. The basic principle of the current sharing remains unchanged.

With the aid of the description presented, those skilled in the art will be able to modify the electronic circuits described and to create alternative circuits implementing similar functions without however straying from the scope of the present invention. Features described for one embodiment may be combined with those of other embodiments unless explicitly otherwise indicated.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for controlling an electrical power supply of a plurality of light sources, said plurality of light sources being divided into at least two groups of light sources, each of said groups having specific current needs,
    said device comprising, for each of said groups, a branch comprising a voltage converter of the step-up type and a voltage converter of the step-down type connected in series and capable of converting an input voltage into a load voltage,
    in which said converters of the step-up type of said each branch operate as a multiphase step-up converter, wherein the device furthermore comprises control means configured to adapt said input current of said step-up converter of said each branch according to the specific current needs of said group connected as a load of said respective branch,
    wherein the control means adapt said input current of said step-up converter of said each branch as a function of a voltage value representative of the average input current of said step-up converter of said branch and as a function of a fraction of the average value of the output voltage $V_{BOOST}$ of said multiphase converter.

2. The device according to claim 1, wherein said control means comprises a comparator for said each branch, which compares said voltage value representative of said average input current of said step-up converters of said branch with a fraction of said average value of said output voltage $V_{BOOST}$ of said multiphase step-up converter, the respective fractions defining the specific current needs of said groups connected as loads of said respective branches,
    and in which said control means comprises interruption means configured to interrupt the current operating cycle of said step-up converter if said value relating to it exceeds said fraction of said average value of said output voltage $V_{BOOST}$ of said multiphase step-up converter with which it is compared.

3. The device according to claim 1, wherein said control means comprises detection means designed to detect a power supply need for each of said groups of light sources.

4. A device for controlling an electrical power supply of a plurality of light sources, said plurality of light sources being divided into at least two groups of light sources, each of said groups having specific current needs,
    said device comprising, for each of said groups, a branch comprising a voltage converter of the step-up type and a voltage converter of the step-down type connected in series and capable of converting an input voltage into a load voltage,
    in which said converters of the step-up type of said each branch operate as a multiphase step-up converter, wherein the device furthermore comprises control means configured to adapt said input current of said step-up converter of said each branch according to the specific current needs of said group connected as a load of said respective branch;
    wherein said control means comprises means designed to switch off said step-up converter and said step-down converter of said branch, following the detection of a fault in said group that is connected to it as a load.

5. The device according to claim 1, wherein said control means comprises clock means connected to the switches of each of said step-up converters and designed to control the latter, said clock means being designed to generate a similar clock signal for each of said converters, the phase difference between the signals being 360° divided by the number of converters.

6. The device according to claim 1, wherein said control means are implemented by a single microcontroller or by several microcontrollers connected via communication means, and via a CAN databus of an automobile vehicle.

7. The device according to claim 1, wherein said light sources are light-emitting diodes, or LEDs.

8. A lighting system for an automobile vehicle, comprising at least one device for controlling said electrical power supply of light sources, the plurality of said light sources being divided into at least two groups of light sources, wherein said device is according to claim 1.

9. A device for controlling an electrical power supply of a plurality of light sources, said plurality of light sources being divided into at least two groups of light sources, each of said groups having specific current needs,
    said device comprising, for each of said groups, a branch comprising a voltage converter of the step-up type and a voltage converter of the step-down type connected in series and capable of converting an input voltage into a load voltage,
    in which said converters of the step-up type of said each branch operate as a multiphase step-up converter, wherein the device furthermore comprises control means configured to adapt said input current of said step-up converter of said each branch according to the specific current needs of said group connected as a load of said respective branch;
    wherein the control means adapt said input current of said step-up converter of said each branch as a function of a voltage value representative of the average input current of said step-up converter of said branch and as a function of a fraction of the average value of the output voltage $V_{BOOST}$ of said multiphase converter;
    wherein said control means comprises detection means designed to detect a power supply need for each of said groups of light sources.

10. The device according to claim 2, wherein said control means comprises detection means designed to detect a power supply need for each of said groups of light sources.

11. The device according to claim 1, wherein said control means comprises means designed to switch off said step-up converter and said step-down converter of said branch, following the detection of a fault in said group that is connected to it as a load.

12. The device according to claim 2, wherein said control means comprises means designed to switch off said step-up converter and said step-down converter of said branch, following the detection of a fault in said group that is connected to it as a load.

13. A device for controlling an electrical power supply of a plurality of light sources, said plurality of light sources being divided into at least two groups of light sources, each of said groups having specific current needs,
said device comprising, for each of said groups, a branch comprising a voltage converter of the step-up type and a voltage converter of the step-down type connected in series and capable of converting an input voltage into a load voltage,
in which said converters of the step-up type of said each branch operate as a multiphase step-up converter, wherein the device furthermore comprises control means configured to adapt said input current of said step-up converter of said each branch according to the specific current needs of said group connected as a load of said respective branch;
wherein said control means comprises detection means designed to detect a power supply need for each of said groups of light sources;
wherein said control means comprises means designed to switch off said step-up converter and said step-down converter of said branch, following the detection of a fault in said group that is connected to it as a load.

14. A lighting system for an automobile vehicle, comprising at least one device for controlling the electrical power supply of light sources, the plurality of said light sources being divided into at least two groups of light sources, wherein said device is according to claim 1.

15. A lighting system for an automobile vehicle, comprising at least one device for controlling the electrical power supply of light sources, the plurality of said light sources being divided into at least two groups of light sources, wherein said device is according to claim 2.

16. A lighting system for an automobile vehicle, comprising at least one device for controlling the electrical power supply of light sources, the plurality of said light sources being divided into at least two groups of light sources, wherein said device is according to claim 3.

17. A lighting system for an automobile vehicle, comprising at least one device for controlling the electrical power supply of light sources, the plurality of said light sources being divided into at least two groups of light sources, wherein said device is according to claim 4.

18. A lighting system for an automobile vehicle, comprising at least one device for controlling the electrical power supply of light sources, the plurality of said light sources being divided into at least two groups of light sources, wherein said device is according to claim 5.

19. The device according to claim 4, wherein said control means comprises clock means connected to the switches of each of said step-up converters and designed to control the latter, said clock means being designed to generate a similar clock signal for each of said converters, the phase difference between the signals being 360° divided by the number of converters.

20. The device according to claim 4, wherein said control means are implemented by a single microcontroller or by several microcontrollers connected via communication means, and via a CAN databus of an automobile vehicle.

21. The device according to claim 4, wherein said light sources are light-emitting diodes, or LEDs.

22. A lighting system for an automobile vehicle, comprising at least one device for controlling said electrical power supply of light sources, the plurality of said light sources being divided into at least two groups of light sources, wherein said device is according to claim 4.

* * * * *